United States Patent [19]

Dust et al.

[11] Patent Number: 4,902,370
[45] Date of Patent: Feb. 20, 1990

[54] SYNTHETIC BASED COLD SEAL ADHESIVES

[75] Inventors: Richard A. Dust, Maidenhead; Peter Causton, Buckinghamshire, both of England

[73] Assignee: National Starch and Chemical Corporation, Bridgewater, N.J.

[21] Appl. No.: 394,996

[22] Filed: Aug. 17, 1989

Related U.S. Application Data

[62] Division of Ser. No. 183,025, Apr. 18, 1989.

[51] Int. Cl.$^4$ ................................................. C09J 3/14
[52] U.S. Cl. .................................. 156/327; 156/331.6; 156/322; 156/334
[58] Field of Search ................. 524/314; 156/332, 334, 156/331.6, 327

[56] References Cited

U.S. PATENT DOCUMENTS

| | | | |
|---|---|---|---|
| 3,222,419 | 12/1965 | Jubilee et al. | 260/836 |
| 3,307,963 | 3/1967 | Webber | 117/68.5 |
| 3,406,039 | 10/1968 | Paufler | 117/76 |
| 3,692,878 | 9/1972 | Blance et al. | 260/901 |

FOREIGN PATENT DOCUMENTS

| | | |
|---|---|---|
| 1080441 | 8/1967 | United Kingdom . |
| 1096058 | 12/1967 | United Kingdom . |
| 1370204 | 10/1974 | United Kingdom . |

OTHER PUBLICATIONS

Japan Application Abstract, Nippon Synth. Chem. Ind., Cold Seal Type Adhesive Preparation, Dec. 12, 1976.
U.S.S.R. Patent Abstract, Cellulose Paper Ind. Res., Cold-Sealing Packaging Paper, Oct. 11, 1982.
EPC Application Abstract, Unilever N.V., Packing Material with Cold Adhesive is Coated with Adhesive on Opposite Sides at Offset Areas, Jun. 24, 1987.

Primary Examiner—Joseph L. Schofer
Assistant Examiner—T. McDonald, Jr.
Attorney, Agent, or Firm—Royal N. Ronning, Jr.; Edwin M. Szala

[57] ABSTRACT

This invention presents a series of synthetic based cold seal adhesives which are capable of forming a strong bond at room temperature, yet which may be reeled up without blocking and stored for extended periods of time. Such adhesives can be used in place of the natural rubber based cold seal adhesives currently used, and thus, can be employed in any packaging application where cold seal properties are desirable.

6 Claims, No Drawings

SYNTHETIC BASED COLD SEAL ADHESIVES

This application is a division of application Ser. No. 07/183,025, filed Apr. 18, 1988.

BACKGROUND OF THE INVENTION

Cold seal adhesives comprise a special class of pressure-sensitive adhesives which possess the capability of forming a strong bond to themselves when pressure is applied, yet are also capable of being applied to a substrate and reeled (as a dried film) for storage without effecting such a bond. Thus, the adhesive must be sufficiently plastic to form a bond under the application of pressure alone, yet sufficiently hard to resist bonding to a substrate during storage. Such adhesives are used in a variety of applications including as envelope sealants and in food packaging where the application of heat to effect a bond is undesirable (e.g. in candy packagings).

To date, the conventional approach to formulating such adhesives has been to combine a natural rubber elastomer (particularly a latex) with a tackifier and other compounds. A typical formulation comprises 55–60% (by wt.) of a high ammonia content natural rubber latex emulsion, 30–40% (by wt.) of a styrene acrylate emulsion, and small amounts of wetting agents, latex stabilizers, antioxidants, biocide, and thickeners. Such compounds exhibit good cold sealing properties. However, they also exhibit the poor aging properties of natural rubber based compounds, including softening and discoloration of the adhesives, possess an objectionable odor, and exhibit undesirable foaming when in the liquid state.

Attempts to replace natural rubber with synthetic rubbers to alleviate these problems has proven to be difficult, however, due to the poor strength of the resultant bonds. Thus, there exists a real need for synthetic-based cold seal adhesives which exhibit good bond strengths.

SUMMARY OF THE INVENTION

It is an object of this invention to present a series of cold seal adhesive formulations based on a synthetic polymer system which is capable of forming a strong bond at room temperature. It is further an object of this invention that each of the adhesives possess a plasticity number sufficiently high to permit it to be reeled up without blocking, yet sufficiently low to permit it to seal to itself with the application of pressure alone.

This invention presents a series of synthetic based cold-seal adhesives which fulfill these objects. The adhesives are comprised of two polymeric components, one being a "soft" base polymer (characterized by a Tg of $-40°$ to $-60°$ C., preferably $-50°$ to $-60°$ C., more preferably $-54°$ C., and a Williams Plasticity Number of 2.5 to 2.9, preferably 2.7) and the other being a "hard" secondary polymer (characterized by a Tg of $-25°$ to $+5°$ C., preferably 31 $15°$ to $0°$ C., more preferably $-10°$ C., and a Williams Plasticity Number 5.0 to 5.6, preferably 5.0 to 5.3, more preferably 5.1). These polymers are maintained in the ratios ranging from about 45/55 to about 70/30 (by weight base/secondary polymer) and produce a pressure-sensitive adhesive which possess the desired composition. It is also anticipated that a single polymer possessing the required properties could be used in place of both components to form a cold-seal adhesive.

The polymers selected for the base and secondary polymers are selected from a wide array of synthetic polymers, copolymers, and polymer mixtures, including acrylic copolymers and styrene butadiene rubbers (SBR's) as base polymers and styrene-acrylic copolymers as secondary polymers. Thus, the instant invention permits the use of synthetic materials in applications in which natural latex rubber was previously the only useful polymer. An additional benefit of the use of synthetic polymers is that the adhesive will be characterized by lower odor, longer shelf life, greater mechanical stability, and lower foaming than its natural polymer counterpart.

The adhesive compositions may also comprise minor (<1% by weight) amounts of antifoaming compounds, wetting agents, and/or antiblocking agents. These materials can augment the desired properties of the compositions and can be tailored to the individual system. Thus, the cold seal adhesives of this invention can be employed in a wide array of applications.

DETAILED DESCRIPTION OF THE INVENTION

The cold seal adhesive compositions of this invention are primarily comprised of two polymers, a "soft" polymer, which gives the composition its pressure sensitive properties and a "hard" polymer, which reduces tack in the composition, permitting it to be reeled up without blocking. These components are mixed to form compositions wherein, the soft polymer comprises about 45 to about 70% (by wt.), preferably 60 to 70%, of the formulation, while the hard polymer comprises about 30 to about 55% (by wt.), preferably 30 to 40%. The relative amounts of each polymer will vary given the specific polymer employed and the applications in which the adhesive is to be used. Thus, the adhesives can be tailored to meet specific needs.

The soft polymers comprise the base polymer composition and are characterized by a Tg of $-40°$ to $-60°$ C., preferably $-50°$ to $-60°$ C., more preferably $-54°$ C., and a Williams plasticity number of 2.5 to 2.9 preferably 2.7. Thus these polymers are quite tacky and impart a high degree of pressure sensitivity to the adhesives. Virtually any synthetic polymer meeting these criteria can be used in the adhesive compositions of this invention, but preferred polymers include acrylic copolymers such as a copolymer comprising 60% (by wt.) butyl acrylate, 30% (by wt.) 2-ethylhexyl acrylate, and 10% vinyl acetate; and styrene butadiene rubbers. Additionally, mixtures of polymers can also be employed in this capacity, with the main criterion for selection being the Tg and plasticity number of the overall mixture; thus, it is not essential that each polymeric component have the requisite properties, only that the polymer mixture possess them. Additionally, in some cases (e.g. with certain acrylic copolymers) it may be necessary to crosslink the polymers to bring its plasticity number to an acceptable level.

The hard polymers and/or resins comprise the secondary polymer composition and are characterized by a Tg of $-25°$ to $+5°$ C., preferably $-15°$ to $0°$ C., more preferably $-10°$ C. and a Williams plasticity number of 5.0 to 5.6, preferably 5.0 to 5.3, more preferably 5.1. Thus these polymers reduce the overall tack and pressure sensitivity of the adhesive composition, permitting its use as a cold seal adhesive. Any polymer meeting these criteria is useful as in the compositions of this invention, but preferred polymers include styrene-acrylic and ethylene vinyl acetate copolymers. Also, as was the case with the soft polymers, mixtures of hard polymeric or hard resin components may also be employed so long as the Tg and plasticity number fall within the acceptable range.

The adhesive compositions may also contain minor (<1% by wt.) amounts of optional materials which servce to augment certain desirable properties of the system. These materials include commercially available antifoaming compounds such as Bevaloid 6681 to 6603, which can be present in an amount ranging from about 0.1 to about 0.5% (by wt.); wetting agents such as sulfosuccinates (e.g. Aerosol MA 80), which can be present in an amount ranging from about 0.2 to about 0.6% (by wt.); and antiblocking agents, such as Aquacer 608, which can be present in an amount up to about 0.5% (by wt.). The compositions listed are given by way of example only; virtually any compound having the desirable properties can be employed in this regard so long as it is compatible with the polymer mixture.

The blended adhesive composition, with or without the optional ingredients, will possess the desirable cold seal properties, namely being capable of forming a seal to itself with application of pressure alone (i.e. without heat), yet also being capable of being reeled up (as a dried film) without blocking. The bond strengths are comparable and, often, superior to those observed with natural rubber based cold seal adhesives. Further, because the polymers are synthetic, they have a much longer shelf-life than the natural rubber based cold seal adhesives currently used in industry. The synthetic adhesive compositions also exhibit a lower odor, a lower tendency to foam (in the liquid state) and a greater mechanical stability than their natural rubber counterparts. These properties permit the materials to be used in cold seal packaging machinery at much higher speeds than the natural rubber based adhesives.

Thus, the synthetic cold seal adhesives of the instant invention are useful in a variety of applications where cold seals are desirable. In each application, the substrate (which may be any material compatible with the adhesive) is coated on both sides of the joint to be sealed with an emulsion (using water or any other compatable solvent as the continuous phase), containing the adhesive at a rate of 3.6-7.0 gm adhesive/$M^2$, preferably 3.6-4.0 gm/$M^2$, and then dried to form a dried film. The adhesive coated substrate can then be stored (up to 12 months) and even reeled into a spiral to facilitate such storage. Subsequently, the coated portions of the joint can be sealed together by the application of a sufficient amount of pressure to effect a tight bond. The precise magnitude of this pressure will depend upon the substrate used and the desired application. In general, 40-60 psi. is desirable.

Such properties are particularly desirable in the manufacture of self-seal envelopes; in food packaging applications where heat should be avoided (especially ice cream, sugar cubes, tea bags, baked products, snacks, milk and dairy products, dried and frozen foods, chocolates and other candies, meats, beverages, condiments/spices, sauces, and pet foods); in sealing of cartons, bags, and other containers; in bundling tapes; in bookbinding; in cigarette and detergent packaging; liquid packaging; and twist wraps; but the adhesives of this invention can be used in any application where ambient temperature self-sealing is desired.

EXAMPLES

The following examples further illustraate certain preferred embodiments of the invention and are not intended to be illustrative of all embodiments.

EXAMPLE 1 COMPARATIVE TESTING

For the purposes of this example, a synthetic cold seal formulation having the following composition was prepared (all percentages are by weight):

| | |
|---|---|
| Base Polymer (60% butyl acrylate (BA), 30% 2-ethyl hexyl acrylate (2-EHA), 10% vinyl acetate (VA)); Tg −54° C., plasticity no. 2.7. | 56.3%, |
| Secondary Polymer | |
| a. Vinacryl Ltd. Vinacryl 71291 (medium styrene content acrylic resin); Tg −18° C., plasticity no. 5.1 | 28.2% |
| b. Copolymer of 70-90% BA, 10-30% VA, 1-5% acrylic acid (AA), 2-7% N—methylolacrylamide; Tg −2° C., plasticity no. 5.3 | 9.4% |
| c. Vinamul, Ltd. Vinacryl 71237 (high styrene content acrylic resin); Tg 6° C., plasticity no. >6 | 4.7 |
| Aersol MA 80 wetting agent | 0.25% |
| Bevaloid 6603 Antifoaming Agent | 0.25% |
| Water | 0.9% |

The preformance of this adhesive (identified as Synthetic) was compared to that of three different commercially available natural rubber based cold seal adhesives produced by National Starch and Chemical Corporation (KL822, KL828, and KL803) in the following determinations (all adhesives were applied as aqueous emulsions):

Seal Strength

The samples were applied to corona-discharge treated pearlised OPP at a concentration of 4 gm/$M^2$ (dry) and dried. A seal was then effected by the application of 60 psi pressure (1 second dwell time), and the samples were tested immediately. The samples were then examined for seal strength in a peel test on a Instron tensometer apparatus. Results are reported as the peel force at which the seal failed (in gm/25 mm) or, if no seal failure occurred, mode of failure, e.g. a film tear (FT) or partial tear (T) prior to seal failure.

Key Strength

Key strength was examined in the same manner as seal strength except that the dried adhesive film was sealed to a standard pressure sensitive tape (Sello tape 1563) rather than itself. The peel force required to pull the adhesive from the substrate was measured and recorded.

% Foam

Foaming tendency was measured in a high speed turbine mixer, by subjecting the adhesive to high speed agitation for 5 minutes. Subsequently, the % foam (by wt.) was calculated on a differential specific gravity basis.

Odor

The presence of an objectionable odor in the adhesive was evaluated on dried films of each adhesive on a polyester substrate. For each test, blind samples were sniffed by 10 volunteers and graded on a scale of 1-5, where 1 represents the minimum odor and 5 represents the maximum.

Blocking Peel Values

Blocking peel values were determind by attempting to seal a dried film of adhesive on corona discharge treated pearlised OPP to a section (25 mm×25 mm) of OPP coated with a polyamide release lacquer under 10 tons pressure for 24 hours. Immediately thereafter, peel values were determined in an Instron Tensometer.

Blocking Probability

Based on the blocking peel value and a subjective visual inspection of the surfaces after this determination, the probability of observing blocking was determined. This was rated on a scale of 1–5. Generally, a value of 4 or less is acceptable for cold seal adhesives.

Mechanical Stability

Mechanical stability was determined using a Haake cone and plate rotoviscometer. The adhesive was subjected to a high shear stress (500 rpm) until a breakdown (indicated by an increase in viscosity) was observed or to a maximum of 5 minutes. Results, are rated on a scale of 1–5, with the rating roughly corresponding to the number of minutes it remained agitated without breakdown.

Estimated Maximum Machine Speed

Based on the results of the % foam and mechanical stability determinations, the maximum speed at which fibers coated with the adhesive can be run through a sealing machine (in m/min) was estimated.

Shelf Life

Shelf life was estimated by determining the life of the adhesive at 40° C., and extrapolating this to estimate the life at ambient temperature (22.5° C.) by comparison with a standard formulation.

Stringing Probability

Stringing probability was evaluated on a scale of 1 (low) to 5 (high) by a panel of 10 observers during peel testing and also during a cutting test wherein the dried film/OPP composite was cut with scissors. Results are reported as the average of the 10 ratings.

Probability of Oxidation

Oxidation probability was examined by exposing a dried film of adhesive on OPP to oxygen under UV light until oxidation or decomposition is observed. The probability is rated on a scale of 1 (low) to 5 (high).

Viscosity

The viscosity of each adhesive was determined at a temperature of 22.5° C. on a Brookfield viscometer. The results are reported in centipoise.

The results of these determinations are summarized in Table I.

TABLE I

| COMPARATIVE PROPERTIES - NATURAL RUBBER BASED COLD SEALS VS SYNTHETIC COLD SEAL | | | | |
|---|---|---|---|---|
| Property | KL 822 | KL 828 | KL 803 | Synthetic |
| Seal Strength g/25 mm | 350 | 400 | 450T | F.T. |
| Key Strength-Adhesion to Film Tape Test | 600 | 700 | F.T. | F.T. |
| % Foam | 38 | 39 | 35 | 20 |
| Odor 1 min–5 max. | 3 | 3 | 3 | 1 |
| Blocking Peel Values* g/25 mm | 8 | 12 | 15 | 15 |
| Blocking Probability 1 min–5 max. | 1 | 2 | 3 | 3 |
| Mechanical Stability using Rotoviscometer 1 min–5 max. | 3 | 3 | 3 | 5 |
| Estimated Machine Speed | 150–170 | 150–170 | 150–170 | 200+ |
| Shelf Life (Months) | 6 | 6 | 6 | 12 |
| Stringing Probability 1 min–5 max. | 1 | 2 | 3 | 3 |
| Probability of Oxidation 1 min–5 max. | 4 | 4 | 4 | 1 |
| Viscosity (cps) | 120 | 120 | 150 | 100 |
| Solids (%) | 55 | 55 | 55 | 57 |

*Blocking peel values were determined using polyamide release lacquer. Other lacquers may give higher or lower values.

It can be seen that the properties of the synthetic based cold seal of this invention are generally comparable to or better than those of the natural rubber based adhesives, with acceptable blocking resisitance, and good % foam, mechanical strength, seal strength, key strength, shelf life, oxidation stability, and odor properties being exhibited.

EXAMPLE 2 EFFECT OF VARYING THE SUBSTRATE FILM

To assess the utility of the cold-seal adhesives of this invention in various packaging applications, the synthetic adhesive used in Example 1 was applied to various commercially available substrate films at a concentration of 3.6 gm/m$^2$ using a K-bar applicator. A portion of these samples was then sealed at a prssure of 40 psi on a Robot Pack-Rite sealer, and another was sealed by high pressure bonding. These samples were examined for peel strength as in Example 1.

A third portion was not sealed and examined for stringing tendency (as in Example 1), rub (a subjective test wherein a subject rubs the dried film with his or her thumb and records the number of rubs required to remove the adhesive) and subjective tack. The results are presented in Table II.

TABLE II

| RESULTS OF VARYING SUBSTRATE FILMS | | | | |
|---|---|---|---|---|
| FILM | SEAL (40 psi) | PRESSURE (High) | Stringing | Rub | Tack |
| PEARLISED POLYPROPYLENE | 300 | 650 Ft. | None | 4 | Slight |
| MDPE | 320 | 580–680 | None | 10+ | " |
| PROPAFILM MG | 240 | 240–320 | None | 10+ | " |
| PROPAFILM C | 360 | 500 | None | 10+ | " |
| MB600 | 300 | 480–650 | None | 10+ | " |
| MXXT/A | 420 | 480–600 | None | 10+ | " |

It can be seen that the adhesive performs satisfactorily on a variety of substrate films.

EXAMPLE 3 EFFECT OF VARYING PLASTICITY NUMBERS

For the purposes of this example, three polymers were prepared as follows:

| Polymer | A | B | C |
|---|---|---|---|
| PN (neat) | 2.7 | 1.9 | 2.4 |
| Compositions (all percentages by weight) | 60% BA 30% 2-EHA 10% VA | A + 0.05% dimethyl maleate (DDM) | 88% 2-EHA 10% acrylonitrile (AN) |

To assess the effect of varying the plasticity numbers (PN) on adhesive strength, these three acrylate based polymers were prepared and cross-linked to the desired PN by aluminum acetate. The resultant adhesives were then applied to corona discharge treated pearlised OPP (at a concentration of 4 gm/M$^2$ and examined both for seal strength (where the seal was made at a pressure of 60 psi) and subjective tack (tack is reported on a 1-10 scale where 1 signifies slight tack and 10 signifies high tack). The results are presented in Table III.

TABLE III
EFFECT OF PLASTICITY NUMBER (PN) ON COLD SEAL PERFORMANCE

| | PN | Seal g/25 MM | Tack (1 Min.-10 Max.) |
|---|---|---|---|
| Polymer A | 2.7 | FT | 8 |
| | 3.0 | 470FT | 6 |
| | 3.5 | 400 | 5 |
| Polymer B | 1.9 | 400 S | 10 |
| | 2.4 | 420 | 8 |
| | 2.8 | 460 T | 7 |
| Polymer C | 2.4 | 450 T | 9 |
| | 2.8 | FT | 7 |
| | 3.3 | 425 | 6 |

T - partial film tear
FT - complete film tear
S - stringing failure

It can be seen that at PN's of 3 and below, the seal strength is quite good, and tack is quite high.

EXAMPLE 4 EFFECT OF RESIN ADDITION

To assess the effect of hard resin or polymer addition to the adhesive compositions, of Example 3 five resins were used as follows:

Resin A-a high styrene content styrene acrylic resin marketed by Vinamul, Ltd. as Vinacryl 71237, having a Tg of 6° C. and a plasticity no. >6.

Resin B-a medium styrene content styrene acrylic resin marketed by Vinamul, Ltd. as Vinacryl 71291, having a Tg of −2° C., and a plasticity no. of 5.3.

Resin C-a low ethylene content EVA resin marketed by Vinamul, Ltd. as Vinamul R32533 stated to contain less than 10% (by wt.) ethylene and greater than 85% (by wt.) vinyl acetate, having a Tg of −2° C. and a plasticity no. of 5.4.

Resin D-a medium ethylene content EVA resin marketed by Vinamul, Ltd. as Vinamul R32598 and stated to contain not less than 10% (by wt.) ethylene and less than 85% (by wt.) vinyl acetate, having a Tg of −21° C. and a plasticity no. of 3.9.

Resin E-an acrylic copolymer resin comprising 70-90% (by wt.) BA, 10-30% (by wt.) VA, 1-5% (by wt.) AA, and 2-7% (by wt.) N-methylolacrylamide, having a Tg of −18° C. and a plasticity No. of 5.1

The resins were mixed with the Polymers A-C (from Example 3) at various ratios and the resultant adhesives were applied to a corona discharge treated pearlised OPP substrate (at a concentration of 4gm/m$^2$) and examined for seal strength and tack as in Example 3. The results are summarized in Table IV.

TABLE IV
EFFECTS OF RESIN ADDITION

| | | Seal gm/25 mm | Tack 1 min-10 max. |
|---|---|---|---|
| Polymer A + Resin A | | | |
| 30 | 70 | 140C | 1 |
| 40 | 60 | 160C | 1 |
| 50 | 50 | 200C | 2 |
| 60 | 40 | 260C | 3 |
| 70 | 30 | 300C | 4 |
| 80 | 20 | 320C | 5 |
| Polymer A + Resin B | | | |
| 30 | 70 | 320 | 2 |
| 40 | 60 | 350 | 2 |
| 50 | 50 | 420T | 3 |
| 60 | 40 | 480TS | 3 |
| 70 | 30 | FT | 4 |
| 80 | 20 | 440T | 6 |
| Polymer A + Resin C | | | |
| 30 | 70 | 250C | 3 |
| 40 | 60 | 300 | 4 |
| 50 | 50 | 350 | 4 |
| 60 | 40 | 420T | 5 |
| 70 | 30 | 470T | 6 |
| 80 | 20 | FT | 7 |
| Polymer A + Resin D | | | |
| 30 | 70 | 300S | 5 |
| 40 | 60 | 340S | 5 |
| 50 | 50 | 370S | 6 |
| 60 | 40 | 420S | 7 |
| 70 | 30 | 420TS | 8 |
| 80 | 20 | 450TS | 8 |
| Polymer A + Resin E | | | |
| 30 | 70 | 250 | 2 |
| 40 | 60 | 310 | 2 |
| 50 | 50 | 340 | 4 |
| 60 | 40 | 390 | 6 |
| 70 | 30 | 440T | 7 |
| 80 | 20 | FT | 8 |
| Polymer B (PN 1.9) + Resin A | | | |
| 30 | 70 | 200C | 3 |
| 40 | 60 | 240C | 5 |
| 50 | 50 | 270 | 6 |
| 60 | 40 | 290S | 7 |
| 70 | 30 | 330S | 8 |
| 80 | 20 | 350S | 9 |
| Polymer B (PN 2.8) + Resin A | | | |
| 30 | 70 | 150C | 1 |
| 40 | 60 | 170C | 1 |
| 50 | 50 | 220C | 2 |
| 60 | 40 | 270C | 3 |
| 70 | 30 | 300C | 4 |
| 80 | 20 | 350 | 6 |
| Polymer B + Resin B | | | |
| 30 | 70 | 340 | 3 |
| 40 | 60 | 400 | 3 |
| 50 | 50 | 430 | 4 |
| 60 | 40 | 470T | 4 |
| 70 | 30 | FT | 6 |
| 80 | 20 | FT | 6 |
| Polymer B + Resin C | | | |
| 30 | 70 | 270 | 3 |
| 40 | 60 | 320 | 3 |
| 50 | 50 | 350 | 4 |
| 60 | 40 | 400 | 5 |
| 70 | 30 | 450T | 6 |
| 80 | 20 | FT | 6 |
| Polymer B + Resin D | | | |
| 30 | 70 | 320S | 4 |
| 40 | 60 | 330S | 4 |
| 50 | 50 | 380S | 6 |
| 60 | 40 | 430S | 7 |
| 70 | 30 | 440S | 8 |
| 80 | 20 | 420S | 8 |
| Polymer B + Resin E | | | |
| 30 | 70 | 270 | 3 |
| 40 | 60 | 320 | 3 |
| 50 | 50 | 360 | 5 |
| 60 | 40 | 420 | 7 |
| 70 | 30 | 470T | 8 |

TABLE IV-continued
EFFECTS OF RESIN ADDITION

|  |  | Seal gm/25 mm | Tack 1 min-10 max. |
|---|---|---|---|
| 80 | 20 | FT | 9 |
| Polymer C (PN 2.4) + Resin D | | | |
| 30 | 70 | 290 | 4 |
| 40 | 60 | 300 | 5 |
| 50 | 50 | 330 | 6 |
| 60 | 40 | 360 | 7 |
| 70 | 30 | 400S | 8 |
| 80 | 20 | 430S | 9 |
| Polymer C (PN 2.8) + Resin A | | | |
| 30 | 70 | 180C | 1 |
| 40 | 60 | 220C | 1 |
| 50 | 50 | 270C | 2 |
| 60 | 40 | 320 | 3 |
| 70 | 30 | 370 | 5 |
| 80 | 20 | 400T | 6 |
| Polymer C + Resin B | | | |
| 30 | 70 | 330 | 3 |
| 40 | 60 | 400 | 3 |
| 50 | 50 | 440 | 4 |
| 60 | 40 | 470T | 5 |
| 70 | 30 | FT | 6 |
| 80 | 20 | FT | 7 |
| Polymer C + Resin C | | | |
| 30 | 70 | 290C | 3 |
| 40 | 60 | 340 | 4 |
| 50 | 50 | 360 | 4 |
| 60 | 40 | 400 | 5 |
| 70 | 30 | 460T | 6 |
| 80 | 20 | FT | 7 |
| Polymer C + Resin D | | | |
| 30 | 70 | 280S | 4 |
| 40 | 60 | 310S | 5 |
| 50 | 50 | 350S | 6 |
| 60 | 40 | 390S | 7 |
| 70 | 30 | 400S | 8 |
| 80 | 20 | 430TS | 9 |
| Polymer C + Resin E | | | |
| 30 | 70 | 300 | 2 |
| 40 | 60 | 350 | 3 |
| 50 | 50 | 400 | 5 |
| 60 | 40 | 450T | 7 |
| 70 | 30 | 480T | 8 |
| 80 | 20 | FT | 9 |

Additionally, mixtures of the resins with 60% polymer A yield the following results:

|  |  | Seal gm/25 mm | Tack 1 min-10 max. |
|---|---|---|---|
| Resin A + Resin B | | | |
| 30 | 10 | 300C | 3 |
| 20 | 20 | 390 | 3 |
| 10 | 30 | FT | 4 |
| Resin A + Resin C | | | |
| 30 | 10 | 340C | 3 |
| 20 | 20 | 390 | 3 |
| 10 | 30 | 450T | 4 |
| Resin A + Resin E | | | |
| 30 | 10 | 270C | 1 |
| 20 | 20 | 350C | 1 |
| 10 | 30 | 370C | 2 |
| Resin B + Resin C | | | |
| 30 | 10 | 400 | 4 |
| 20 | 20 | 440T | 4 |
| 10 | 30 | 440T | 3 |
| Resin B + Resin E | | | |
| 30 | 10 | FT | 4 |
| 20 | 20 | 430T | 3 |
| 10 | 30 | 390 | 2 |
| Resin C + Resin E | | | |
| 30 | 10 | 410 | 3 |
| 20 | 20 | 370 | 2 |
| 10 | 30 | 340 | 1 |

FT - complete film tear
T - partial film tear
S - stringing failure
C - cohesive failure It can be seen that a good seal and low tack (P.N. ≦3) is only attainable when the resin and polymer are in a percentage range which varies as the polymer and resins are varied. Too high a polymer content results in high tack, while too high resin content results in a lower seal strength. In all cases, it appears that at least about 45% polymer is required. Also, since these parameters vary as the composition varies, the adhesive can be formulated to achieve the desired properties as the application dictates.

Similarly, resins having too high (A) or too low (D) a Plasticity Number form unsatisfactory seals, except when mixed with other resins. Thus, resin mixtures can be used to obtain satisfactory performance with resins not having the desired Plasticity Numbers.

It is apparent that many modifications and variations of this invention as hereinabove set forth may be made without departing from the spirit and scope thereof. The specific embodiments described are given by way of example only and the invention is limited only by the terms of the appended claims.

What is claimed is:

1. A method for forming a cold seal bond on a substrate comprising
   (i) coating all or a portion of said substrate with an effective amount of emulsion containing a cold seal adhesive composition, wherein said cold seal adhesive composition comprises about 45 to 70% (by wt.) of a synthetic base polymer and about 30 to about 55% (by wt.) of a synthetic secondary polymer, wherein the base polymer comprises a synthetic polymer, a synthetic copolymer, or any mixture thereof characterized in that it possesses a Tg of about −40° to about −60° C. and a Williams plasticity number of about 2.5 to about 2.9; and secondary polymer comprises a styrene-acrylic copolymer, a stryene-acrylic resin, or any mixture thereof, or an admixture of one or more styrene-acrylic copolymers, styrene-acrylic resins, or any mixture thereof, with one or more synthetic polymers, synthetic copolymers, or synthetic resins characterized in that it possesses a Tg of about −25° to about +5° C. and a plasticity number of about 5.0 to about 5.6;
   (ii) drying said emulsion to form a dried film; and
   (iii) subsequently bringing the coated portions of the substrate into contact with each other such that a bond is effected.

2. The method of claim 1, wherein the emulsion is an aqueous emulsion.

3. The method of claim 1, wherein the substrate is corona discharge treated pearlised polypropylene.

4. The method of claim 1, wherein the substrate is coated with adhesive at a rate of 3.6–7.0 gm adhesive/$M^2$.

5. The method of claim 4, wherein the adhesive is applied using a K-bar applicator.

6. The method of claim 1, wherein the seal is made using 40–60 psi pressure.

* * * * *